United States Patent
Hegner et al.

(10) Patent No.: US 8,485,042 B2
(45) Date of Patent: Jul. 16, 2013

(54) METHOD FOR MANUFACTURING AN ELASTIC BODY OF AL2O3 CERAMIC, MEASURING MEMBRANE FOR A PRESSURE SENSOR AND PRESSURE SENSOR WITH SUCH A MEMBRANE

(75) Inventors: Frank Hegner, Lorrach (DE); Andreas Roßberg, Bad Sackingen (DE); Frank Kastner, Weißenborn (DE); Henry Ludwig, Gera (DE); Uta Oberbach, Reichenbach (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 133 days.

(21) Appl. No.: 13/057,487

(22) PCT Filed: Jun. 23, 2009

(86) PCT No.: PCT/EP2009/057827
§ 371 (c)(1),
(2), (4) Date: Feb. 4, 2011

(87) PCT Pub. No.: WO2010/015456
PCT Pub. Date: Feb. 11, 2010

(65) Prior Publication Data
US 2011/0132097 A1 Jun. 9, 2011

(30) Foreign Application Priority Data

Aug. 5, 2008 (DE) .......................... 10 2008 036 381

(51) Int. Cl.
*G01L 7/08* (2006.01)
(52) U.S. Cl.
USPC .............................................. 73/715; 29/592
(58) Field of Classification Search
USPC .......................................................... 73/715
See application file for complete search history.

(56) References Cited

U.S. PATENT DOCUMENTS

| | | | | |
|---|---|---|---|---|
| 7,107,855 | B2 * | 9/2006 | Bjoerkman | 73/724 |
| 7,148,077 | B2 * | 12/2006 | Fuertsch et al. | 438/53 |
| 7,802,481 | B2 * | 9/2010 | Henn et al. | 73/715 |
| 2003/0125189 | A1 | 7/2003 | Castro et al. | |
| 2005/0204821 | A1 * | 9/2005 | Fischer et al. | 73/715 |

FOREIGN PATENT DOCUMENTS

| | | |
|---|---|---|
| DE | 100 52 053 A1 | 4/2002 |
| DE | 699 12 541 T2 | 9/2004 |
| DE | 10 2005 059 099 A1 | 6/2007 |
| DE | 600 36 323 T2 | 1/2009 |
| EP | 2 067 754 A2 | 6/2009 |
| WO | WO 2010/015456 A1 | 2/2010 |

OTHER PUBLICATIONS

English translation of the International Preliminary Examination Report.

* cited by examiner

*Primary Examiner* — Andre Allen
(74) *Attorney, Agent, or Firm* — Bacon & Thomas, PLLC

(57) ABSTRACT

A method for manufacturing an elastic deformation body made of an $Al_2O_3$ ceramic according to which a highly pure alumina having at most 2000 ppm MgO, at most 200 ppm inorganic impurities, a specific surface of at least 10 m²/g, an average grain size of at most 0.3 μm is applied. With the alumina and additives, there is produced via aqueous processing a homogeneous mixture, from which a pressable spray granulate is produced, which is formed by means of a uniaxial pressing method to a homogeneous, green body, which is subjected to a sinter process. The resulting elastic deformation body has a bending fracture stress $\sigma_c$, whose distribution $F(\sigma_c)$ is given by the Weibull parameters $\sigma_0 \geq 800$ MPa and $m \geq 24$, with an average grain size of the sintered material of no more than 2 μm, and wherein the sintered material of the deformation body has a density of not less than 3.98 g/cm³.

19 Claims, 2 Drawing Sheets

METHOD FOR MANUFACTURING AN ELASTIC BODY OF AL2O3 CERAMIC, MEASURING MEMBRANE FOR A PRESSURE SENSOR AND PRESSURE SENSOR WITH SUCH A MEMBRANE

TECHNICAL FIELD

The invention relates to the manufacture of an elastic body made of Al2O3 ceramic, especially an elastic deformation body made of this material, especially a measuring membrane, also referred to as a measuring diaphragm. Furthermore, the invention relates to such a measuring membrane and to a pressure sensor with such a measuring membrane.

BACKGROUND DISCUSSION

Elastic deformation bodies are applied as measuring membranes in pressure sensors. Thus, a pressure sensor usually includes a measuring membrane, which is contactable with the pressure to be measured and experiences a pressure-dependent deformation. The pressure sensor furthermore usually includes a transducer, with which the deformation of the deformation body and measuring membrane, respectively, is converted into a signal, especially into an electrical signal. Examples of such transducers include capacitive transducers, resistive transducers and transducers having a mechanical resonator. An overview of pressure sensors and established transducer principles is given in "Drucksensoren" ("Pressure Sensors") by Pfeifer and Werthschützky, Berlin 1989.

The development of ceramic pressure sensors, especially those with deformation elements, e.g. measuring membranes, made of $Al_2O_3$ ceramic and having a capacitive transducer for industrial process measurements technology, has been moved forward especially by Hegner et al. Noted in this regard by way of example are European patents EP0351701 B1, EP0414871 B1 and EP0445382 B1

Deformation bodies, or measuring membranes, made of a $Al_2O_3$ ceramic are advantageous insofar as they exhibit great long-term stability and an absence of hysteresis. Further need for optimization exists, however, as regards breaking stress, because sensitivity and overload resistance, respectively, of a pressure sensor can be increased therewith.

EP 0756586 B1 (Krell) does not directly concern elastic deformation bodies or measuring membranes; yet, it nevertheless contains a good overview of the field of high strength aluminum oxide materials. According to Krell, high strength, highly pure, fine-grained aluminum oxide materials could be achieved only by selection of highly active, fine-grained, high purity, starting powders, with which, by a suitable forming method, a low defect, pore-free structure was achieved. Described by Krell are, without exception, forming methods based on use of a liquid slurry. Through suitable methods such as gel casting or pressure filtration, water is withdrawn from the slurry, and, in the ideal case, a homogeneous green body results. A decisive advantage of liquid forming lies in the fact that, through the initial mobility of the solid particles in the liquid medium, with suitable processing, an as dense and homogeneous a packing of the solid particles as possible is reached. In this way, low-defect structures with high mechanical strengths are achieved in the sinter bodies. Such low-defect structures and, respectively, low-defect, formed bodies cannot, according to Krell, be achieved via usual forming methods, such as, for example, dry pressing. Dry pressing leads to insufficient green density, and, respectively, to density inhomogeneities in the formed bodies, and, in the sintering, to hardness-decreasing and strength-decreasing defects.

All customary press methods are based on the densification of granulates produced via spray drying, among other things. As a function of the character of the granular material, it cannot be avoided that cavities form between and in the densified granulates. These cavities cannot be completely removed during the sinter process. Mechanical properties are negatively influenced by these defects remaining in the structure.

The concepts for the forming methods of Krell, as based on a slurry, are thus so sketched. However, these forming methods are very complex and too expensive for mass production of deformation elements for pressure sensors.

Additionally, Krell permits comparatively large proportions of glass-forming, sinter aids, especially $SiO_2$. These sinter aids enable a reduced sinter temperature, and thereby lessen grain growth, which can lead to increased fracture stress as well as hardness. On the other hand, a glass phase is an impediment for application of the sinter body as an elastic body in measurements technology. Investigations in connection with the present invention have shown, namely, that glass phases in the structure lessen the relaxation capability of the sinter body and its resistance to corrosion. Limiting grain size via $SiO_2$ is infeasible from a practical point of view.

It is, consequently, an object of the present invention to provide a method, with which elastic bodies made of $Al_2O_3$ ceramic, especially elastic deformation bodies, especially measuring membranes for pressure sensors, are manufacturable at acceptable costs in mass production.

SUMMARY OF THE INVENTION

Objects of the invention are achieved by the method for manufacturing an elastic deformation body made of an $Al_2O_3$ ceramic by application of an alumina, comprising the steps of:

forming a mixture including alumina, including MgO components: producing from the mixture a pressable spray granulate; and the spray granulate is then formed by means of a uniaxial pressing method to a homogenous green body, wherein: the alumina, including MgO components present in given cases, has a purity of at least 99.8%, preferably 99.9%, and wherein MgO amounts to no more than 2000 ppm, preferably no more than 1000 ppm, with respect to the mass of the $Al_2O_3$;

the alumina, with respect to mass of the $Al_2O_3$, has, in sum, an impurities content of less than 200 ppm, preferably less than 100 ppm, of $SiO_2$, $Na_2O$, $K_2O$, CaO and other inorganic impurities;

the alumina has a specific surface area of not less than 10 $m^2/g$;

the alumina has a grain size $d_{50}$, at cumulative 50 mass %, of no more than 0.3 µm;

with the alumina, as well as organic and, in given cases, inorganic additives, there is produced via aqueous processing a homogeneous mixture;

the mixture, with respect to the mass of the $Al_2O_3$, contains up to 2000 ppm MgO, preferably no more than 1000 ppm MgO;

the mixture, with respect to the mass of the $Al_2O_3$, contains not less than 200 ppm MgO, preferably not less than 400 ppm MgO;

the mixture, with respect to the mass of the $Al_2O_3$, has, in sum, an impurities content of less than 200 ppm, preferably less than 100 ppm, of $SiO_2$, $Na_2O$, $K_2O$, CaO and other inorganic impurities;

the green body is exposed to a one- or multi-stage sinter process, the resulting elastic deformation body has a bending fracture stress $\sigma_c$, whose distribution $F(\sigma_c)$ is given by the Weibull parameters $\sigma_0 \geq 800$ MPa, preferably $\sigma_0 \geq 850$ MPa, and $m \geq 24$;

the average grain size of sintered material of the deformation body, which is ascertained as median value of the cross sectional distribution, amounts to no more than 2 µm, preferably no more than 1 µm; and the sintered material of the deformation body has a density of not less than 3.98 g/cm³;

by the measuring membrane for a pressure sensor wherein:

the measuring membrane especially was produced by a method, wherein:

said measuring membrane comprises an $Al_2O_3$ ceramic having an $Al_2O_3$ content of not less than 99.8 mass %, preferably not less than 99.9 mass %, a density of not less than 3.98 g/cm³ and an average structural grain size of $d \leq 2$ µm, preferably $d \leq 1$ µm;

the $Al_2O_3$ ceramic, with respect to the mass of the $Al_2O_3$, contains up to 2000 ppm MgO, preferably no more than 1000 ppm MgO; and the $Al_2O_3$ ceramic, with respect to the mass of the $Al_2O_3$, has, in sum, an impurities content of less than 200 ppm, preferably less than 100 ppm, of $SiO_2$, $Na_2O$, $K_2O$, CaO and other inorganic impurities; and by the pressure sensor, comprising a platform and a measuring membrane, wherein:

said platform comprises an aluminum oxide ceramic.

The method of the invention for manufacturing a deformation body made of an $Al_2O_3$ ceramic applies alumina, wherein the alumina, including MgO-components present in given cases, has a purity of at least 99.8%, preferably 99.9%, and wherein MgO amounts to no more than 2000 ppm, preferably no more than 1000 ppm, with respect to the mass of the $Al_2O_3$, wherein the alumina, with respect to the mass of the $Al_2O_3$, has, in sum, an impurities content of less than 200 ppm, preferably less than 100 ppm, of $SiO_2$, $Na_2O$, $K_2O$, CaO and other inorganic impurities, wherein the alumina has a specific surface area of not less than 10 m²/g, wherein the alumina has a grain size $d_{50}$, at cumulative 50 mass %, of no more than 0.3 µm, wherein, with the alumina, as well as organic and, in given cases, inorganic additives, there is produced via aqueous processing a homogeneous mixture, wherein the mixture, with respect to the mass of the $Al_2O_3$, contains up to 2000 ppm MgO, preferably no more than 1000 ppm MgO, wherein the mixture, with respect to the mass of the $Al_2O_3$, contains not less than 200 ppm MgO, preferably not less than 400 ppm MgO, wherein the mixture, with respect to the mass of the $Al_2O_3$, has, in sum, an impurities content of less than 200 ppm, preferably less than 100 ppm, of $SiO_2$, $Na_2O$, $K_2O$, CaO and other inorganic impurities, wherein produced from this mixture is a pressable spray granulate, wherein the spray granulate is then formed by means of a uniaxial pressing method to a homogeneous, green body, wherein the green body is exposed to a one- or multi-stage sinter process, wherein the resulting elastic deformation body has a bending fracture stress $\sigma_c$, whose distribution $F(\sigma_c)$ is given by the Weibull parameters $\sigma_0 \geq 800$ MPa, preferably $\sigma_0 \geq 850$ MPa, and $m \geq 24$, wherein:

$$F(\sigma_c) = 1 - \exp\left[-\left(\frac{\sigma_c}{\sigma_0}\right)^m\right]$$

wherein the average grain size of the sintered material of the deformation body, which is ascertained as the median value of the cross sectional distribution, amounts to no more than 2 µm, preferably no more than 1 µm, and wherein the sintered material of the deformation body has a density of not less than 3.98 g/cm³.

The sintered material of the deformation body preferably further comprises a structure with inhomogeneities having a dimensionless defect density of no more than $30 \cdot 10^{-3}$, wherein the defects belong to one or more of the following categories:

Cracks and/or porous regions along the boundaries of powder aggregates/powder agglomerates, nest-like, porous, structural regions, and/or pores having a diameter exceeding double the structural grain size, and grains having a diameter of more than 10 µm and/or more than 10 µm large agglomerates of individual grains having an average agglomerate diameter exceeding five times the grain size.

In a further development of the invention, the sinter process of the method includes a presintering at 1250° C.-1350° C., wherein the sinter process further comprises a redensification under a protective gas atmosphere at pressures of 100 MPa and temperatures of 1250° C.-1400° C.

The dense sintering at 1250° C. to 1400° C. can, in another embodiment of the invention, also occur without the redensification under a protective gas atmosphere.

In a further development of the invention, during the uniaxial pressing, a pressing tool is used, which has a surface coating which contains carbon.

In an embodiment of the invention, the pressable spray granulate has a size distribution with a lower limit of not less than 20 µm, preferably not less than 30 µm, and an upper limit of no more than 100 µm, preferably no more than 50 µm.

For adjusting the deformability of the grains of the spray granulate, the water content, the proportion of organic additives, especially of binders, dispersion agents and lubricants, are available as parameters.

In an embodiment of the invention, the pressable spray granulate has a content of organic additives of no more than 12 mass %, preferably no more than 9 mass %.

In an embodiment of the invention, there are added to the spray granulate compounds of elements of the alkali and alkaline earth groups, wherein the proportion of these compounds amounts to no more than 500 ppm.

In an embodiment of the invention, during the uniaxial pressing for forming the spray granulates, a pressing pressure in a range of 200-300 MPa is applied.

In an embodiment of the invention, during the uniaxial pressing, a green density of the pressed formed bodies of not less than 55% of the theoretical, or. maximum achievable, density of sintered $Al_2O_3$ is achieved.

In an embodiment of the invention, the uniaxial pressing for forming the green body includes a plurality of holding times at constant pressing pressure. These holding times serve especially for optimal de-airing and deformation of the green body and for relaxation of wall friction.

In a further development of the invention, the uniaxial pressing occurs under defined climatic conditions, especially at a relative humidity of no more than 40%, and a working temperature about between 20° C. and 23° C.

The measuring membrane of the invention for a pressure sensor, especially a measuring membrane produced with the method of the invention, comprises an $Al_2O_3$ ceramic having an $Al_2O_3$ content of not less than 99.8 mass %—preferably not less than 99.9 mass %—a density of not less than 3.98 g/cm³ and an average structural grain size of $d \leq 2$ µm, preferably $d \leq 1$ µm, wherein the $Al_2O_3$ ceramic, with respect to the mass of the $Al_2O_3$, contains up to 2000 ppm MgO, preferably no more than 1000 ppm MgO, and wherein the $Al_2O_3$ ceramic, with respect to the mass of the $Al_2O_3$, has, in sum, an impurities content of less than 200 ppm, preferably less than 100 ppm, of $SiO_2$, $Na_2O$, $K_2O$, CaO and other inorganic impurities.

In a further development of the invention, the measuring membrane comprises an $Al_2O_3$ ceramic having a bending fracture stress ($\sigma_c$), whose distribution $F(\sigma_c)$ is given by the Weibull parameters $\sigma_0 \geq 800$ MPa, preferably $\sigma_0 \geq 850$ MPa, and $m \geq 24$.

In a further development of the invention, the measuring membrane has one surface or two surfaces, which is/are smoothed by grinding and/or lapping. It can, in such case, be advantageous to expose the measuring membrane after the grinding and/or lapping to a thermal treatment—annealing—in order to heal defects introduced by the grinding or lapping.

A pressure sensor of the invention includes a platform and a measuring membrane of the invention, wherein the platform comprises an aluminum oxide ceramic.

In a further development of the pressure sensor of the invention, the measuring membrane and the platform are joined by means of an active hard solder, or braze, for example, by means of a Zr—Ni—Ti alloy.

In a further development of the pressure sensor, between the platform and the measuring membrane, a pressure chamber is formed, wherein the pressure chamber, at a thickness of the measuring membrane of 100 μm, has an He leak-rate per unit membrane surface of no more than $2 \cdot 10^{-11}$ mbar·L/(s·m²), preferably no more than $1 \cdot 10^{-11}$ mbar·L/(s·m²), especially preferably no more than $0.5 \cdot 10^{-11}$ mbar·L/(s·m²).

The mutually facing faces of the platform and the measuring membrane each have, in the case of a capacitive pressure sensor, at least one electrode, wherein the electrode of the measuring membrane can comprise, for example, tantalum, and the electrode of the platform, for example, tantalum or a conductive layer containing, for example, at least one noble metal and glass. In a preferred embodiment of the invention, the conductive layer comprises Au, Pt and glass.

The deformation body manufactured with the method of the invention can especially be disc-shaped, wherein, for example, an outer diameter between 5 mm and 40 mm, with a tolerance of, for example, +/−0.15 mm, and a thickness between, for example, 0.10 mm and 3 mm are suitable dimensions for a measuring membrane for a pressure sensor.

BRIEF DESCRIPTION OF THE DRAWINGS

The invention will now be explained in greater detail on the basis of the appended drawing, the figures of which show as follows.

DETAILED DISCUSSION IN CONJUNCTION WITH THE DRAWINGS

Figure 1:
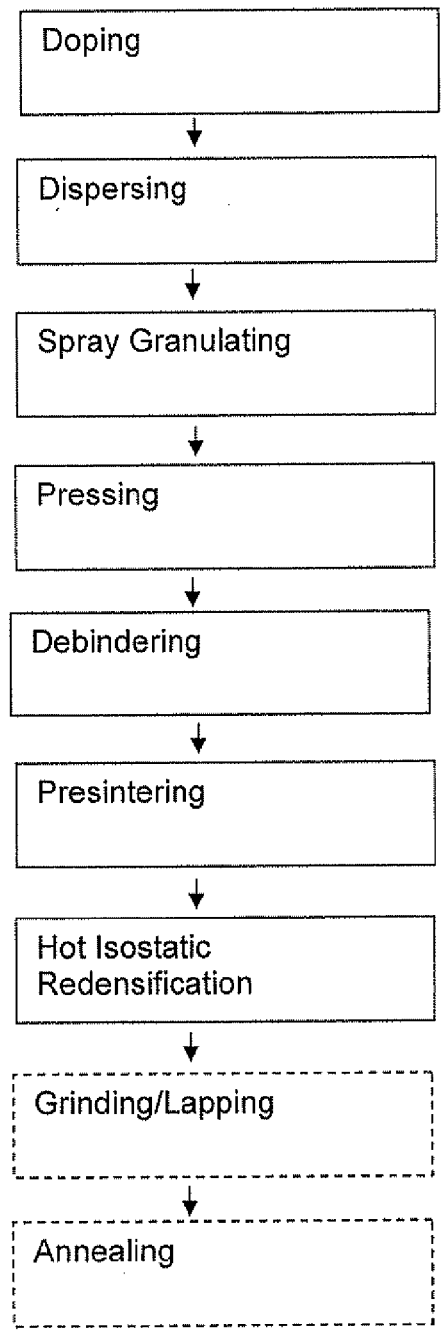
FIG. 1 is a flow diagram of the method of the invention.

As raw material for the method shown in FIG. 1, an alumina with following properties is used:

| | |
|---|---|
| Specific surface area: | 13 m²/g |
| grain size $d_{50}$ at cumulative 50 mass %: | 0.13 μm |
| purity: | 99.99% |

As doping agent, MgO in the form of magnesium hydroxide carbonate is used, which is added in such a quantity, that the desired proportion of MgO is achieved.

Dispersing

The alumina is converted into a pressed granulate. For such purpose, an aqueous slurry is first produced, which is dispersed in a stirring ball mill. 3.000 g alumina with the addition of 1.6 L distilled water, 500-1000 ppm MgO, 0.5-1.5% plasticizer, 1.5-7% binder and lubricant are dispersed for a duration of e.g. 30 min in the circulatory system. Thereafter, the slurry is sieved over a 100 μm-sieve.

Spray Granulation

As the next step, the slurry is sprayed in a spray tower at a tower temperature of 150-250° C. The granular material obtained is sieved over a 315 μm sieve. The granulate size distribution is determined. The $X_{50}$-value lies in a range of 20-40 μm, preferably 30 μm. The granular material possesses a moisture content of max. 0.4%.

Uniaxial Pressing

Uniaxial pressing of the components occurs on a hydraulic press. Produced are discs with a diameter of 5-40 mm and a height of 1.0-5 mm. The specific pressing pressure lies in the range of 200-300 MPa, preferably 210 MPa.

Thermal Binder Removal

Following this, the thermal binder removal of the green body occurs. This occurs in a batch furnace with thermal afterburning. Over a period of time of 100-120 hours, the temperature is increased in stages to 1000° C. Thereafter, it is cooled in a defined manner over a period of 360 min to room temperature.

Presintering

Presintering occurs in a high-temperature furnace. The debindered, formed bodies are sintered with a heat-up rate of 2 K/min up to a temperature of 1250-1350° C. in such a manner, that there is no longer any open porosity present. Holding time at e.g. 1300° C. amounts to 2 hours. Cooling occurs at 10 K/min.

Hot Isostatic Redensification (HIP)

The presintered formed bodies are redensified in a hot isostatic press under an argon atmosphere at a pressure of $\geq 100$ MPa for 2 hours at 1250-1400° C.

Grinding and Lapping

The components are ground, for example, with diamond D64C50, on a fine grinding machine. Thereafter, the lapping occurs by means of boron carbide, for example, with a grit size F 600.

Annealing

In order to remove stresses and microcracks induced during grinding and lapping of the components, these are annealed in a batch furnace. This occurs, for example, at a temperature of 1400° C. with a holding time at this temperature of 4 hours.

Strength Measurement

The strength measurement is carried out by means of a double-ring bending test according to DIN ISO 6474.

Geometrical Data of the Component

| | |
|---|---|
| e.g. | |
| diameter | 32.4 mm +/− 0.15 |
| thickness | 0.24 mm +/− 0.01 |
| flatness (Wt) | 8 μm |
| roughness (Ra) | 0.4 μm |
| helium hermeticity: | $\leq 1 \times 10^{-14}$ mbar × l × s$^{-1}$ |

Figure 2:
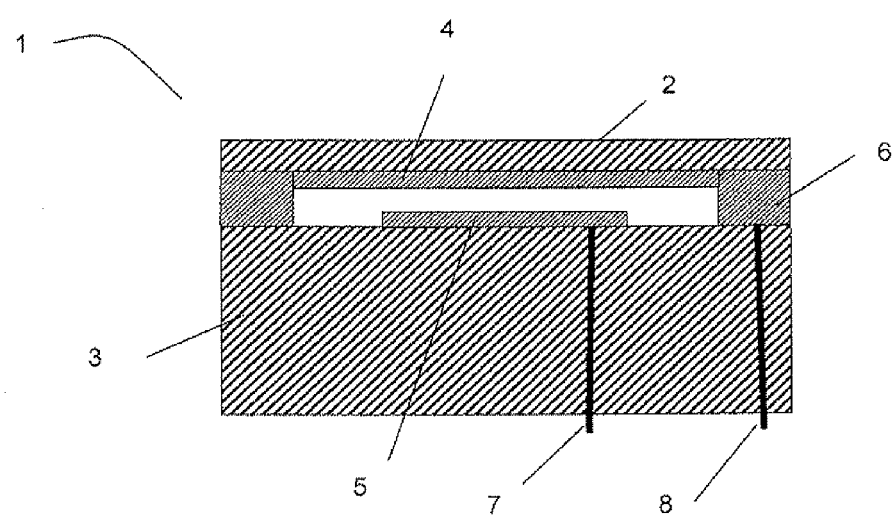
FIG. 2 is a longitudinal section through a pressure sensor of the invention.

The helium hermeticity was especially ascertained on the basis of a pressure sensor of the invention, as presented in FIG. 2.

The pressure sensor 1 of the invention includes a circular, disk-shaped, measuring membrane 2, which was produced by means of the method of the invention, and a likewise circular, disk-shaped platform 3, which likewise comprises corundum, wherein the material of the platform 3 need not fulfill the named requirements for purity and ultimate tensile strength, for it is, on the one hand, not media-contacting and, on the other hand, due to its significantly greater thickness, not exposed to the same bending stresses as the measuring membrane.

The measuring membrane includes on its side facing the platform a measuring electrode 4, which, for example, comprises Ta.

Opposite the measuring electrode 4, platform 3 has on its opposing face a counterelectrode 5, which can comprise the same materials as the measuring electrode, or is fired on from a paste containing glass, Au and Pt. The measuring membrane 2 and the platform 3 are joined by means of an active braze preform 6, which contains a Zr—Ni—Ti alloy, wherein the active braze at the same time serves for contacting the measuring electrode 4.

For tapping the potentials of the measuring electrode 4 and the counterelectrode 5, the active braze 6 and the counterelectrode 5 are contacted via electrical feedthroughs 8, 7, which extend through the platform in the axial direction.

The invention claimed is:

1. A method for manufacturing an elastic deformation body made of an $Al_2O_3$ ceramic by application of an alumina, comprising the steps of:
    forming a mixture including alumina, including MgO components:
    producing from the mixture a pressable spray granulate; and
    the spray granulate is then formed by means of a uniaxial pressing method to a homogenous green body, wherein:
    the alumina, including MgO components present in given cases, has a purity of at least 99.9%, and wherein MgO amounts to no more than 1000 ppm, with respect to the mass of the $Al_2O_3$;
    the alumina, with respect to the mass of the $Al_2O_3$, has, in sum, an impurities content of less than 200 ppm, of $SiO_2$, $Na_2O$, $K_2O$, CaO and other inorganic impurities;
    the alumina has a specific surface area of not less than 10 $m^2/g$;
    the alumina has a grain size $d_{50}$, at cumulative 50 mass %, of no more than 0.3 μm;
    with the alumina, as well as organic and, in given cases, inorganic additives, there is produced via aqueous processing a homogeneous mixture;
    the mixture, with respect to the mass of the $Al_2O_3$, contains up to 1000 ppm MgO;
    the mixture, with respect to the mass of the $Al_2O_3$, contains not less than 200 ppm MgO,
    the mixture, with respect to the mass of the $Al_2O_3$, has, in sum, an impurities content of less than 200 ppm, of $SiO_2$, $Na_2O$, $K_2O$, CaO and other inorganic impurities;
    the green body is exposed to a one- or multi-stage sinter process;
    the resulting elastic deformation body has a bending fracture stress $C_c$, whose distribution $F(\sigma_c)$ is given by the Weibull parameters $\sigma_0 \geq 800$ MPa, and $m \geq 24$;
    the average grain size of sintered material of the deformation body, which is ascertained as median value of the cross sectional distribution, amounts to no more than 2 μm, and
    the sintered material of the deformation body has a density of not less than 3.98 $g/cm^3$.

2. The method as claimed in claim 1, wherein:
the sinter process of the method comprises a presintering at 1250° C.-1350° C.

3. The method as claimed in claim 2, wherein:
the sinter process further comprises a redensification under a protective gas atmosphere at pressures of 100 MPa and temperatures of 1250° C.-1400° C.

4. The method as claimed in claim 1, wherein:
the sinter process includes a dense sintering at 1250° C. to 1400° C., which occurs without a redensification under a protective gas atmosphere.

5. The method as claimed in claim 1, wherein:
the pressable spray granulate has a size distribution with a lower limit of not less than 20 μm, and an upper limit of no more than 100 μm.

6. The method as claimed in claim 1, wherein:
the pressable spray granulate has a content of organic additives of no more than 9 mass %.

7. The method as claimed in claim 1, wherein:
added to the spray granulate are compounds which inhibit grain growth, especially combinations of elements of the alkali and alkaline earth groups or the rare earth group;
the proportion of the compounds amounts to no more than 500 ppm.

8. The method as claimed in claim 1, wherein:
during the uniaxial pressing for forming the spray granulates, a pressing pressure in a range of 200-300 MPa is applied.

9. The method as claimed in claim 1, wherein:
during the uniaxial pressing, a green density of the pressed, formed bodies of not less than 55% of theoretical, or maximum, achievable density of sintered $Al_2O_3$ is achieved.

10. The method as claimed in claim 1, wherein:
the uniaxial pressing includes, for forming the green body, a plurality of holding times at constant pressing pressure or pressing distance.

11. The method as claimed in claim 1, wherein:
the uniaxial pressing occurs under defined climatic conditions, especially at a relative humidity of no more than 40% and a working temperature between, for instance, 20° C. and 23° C.

12. The method as claimed in claim 1, wherein:
the sintered material of the deformation body has a structure with inhomogeneities having a dimensionless defect density of not more than $30 \cdot 10^{-3}$, wherein defects belong to one or more of the following categories:
    cracks and/or porous regions along limits of powder aggregates/powder agglomerates,
    nest-like, porous, structural regions,
    pores having a diameter exceeding double the structural grain size, and
    grains having a diameter of more than 10 μm, and/or more than 10 μm large agglomerates of individual grains having an average agglomerate diameter exceeding five times the grain size.

13. A measuring membrane for a pressure sensor, wherein the measuring membrane especially was produced by a method according to claim 1, wherein:
- said measuring membrane comprises an $Al_2O_3$ ceramic having an $Al_2O_3$ content of not less than 99.9 mass %, a density of not less than 3.98 g/cm$^3$ and an average structural grain size of d≧2 μm;
- the $Al_2O_3$ ceramic, with respect to the mass of the $Al_2O_3$, contains up to 1000 ppm MgO; and
- the $Al_2O_3$ ceramic, with respect to the mass of the $Al_2O_3$, has, in sum, an impurities content of less than 200 ppm, of $SiO_2$, $Na_2O$, $K_2O$, CaO and other inorganic impurities.

14. The measuring membrane as claimed in claim 13, wherein:
- said measuring membrane comprises an $Al_2O_3$ ceramic having a bending fracture stress $C_c$, whose distribution $F(C_c)$ is given by Weibull parameters $C_0$≧800 MPa and m≧24.

15. The measuring membrane as claimed in claim 13, wherein:
- said measuring membrane has at least one surface smoothed by grinding and/or lapping.

16. The measuring membrane as claimed in claim 15, wherein:
- said measuring membrane was annealed after grinding and/or lapping.

17. A pressure sensor, comprising a platform and a measuring membrane as claimed in claim 13, wherein:
- said platform comprises an aluminum oxide ceramic.

18. The pressure sensor as claimed in claim 17, wherein:
- said measuring membrane and said platform are joined by means of an active braze, for example, a Zr—Ni—Ti alloy.

19. The pressure sensor as claimed in claim 17, wherein:
- a pressure chamber is formed between said platform and said measuring membrane; and
- said pressure chamber, at a thickness of the isolating diaphragm of 100 μm, has an He-leak rate per unit membrane surface area of no more than $0.5 \cdot 10^{-11}$ mbar·l/(s·m$^2$).

* * * * *